United States Patent
Patel et al.

(10) Patent No.: US 9,632,519 B2
(45) Date of Patent: Apr. 25, 2017

(54) CLASS AB INVERTING DRIVER FOR PNP BIPOLAR TRANSISTOR LDO REGULATOR

(71) Applicant: Linear Technology Corporation, Milpitas, CA (US)

(72) Inventors: Amitkumar P. Patel, San Jose, CA (US); Anthony K. Bonte, San Jose, CA (US)

(73) Assignee: Linear Technology Corporation, Milpitas, CA (US)

( * ) Notice: Subject to any disclaimer, the term of this patent is extended or adjusted under 35 U.S.C. 154(b) by 50 days.

(21) Appl. No.: 14/706,527

(22) Filed: May 7, 2015

(65) Prior Publication Data

US 2015/0362935 A1  Dec. 17, 2015

Related U.S. Application Data

(60) Provisional application No. 62/013,428, filed on Jun. 17, 2014.

(51) Int. Cl.

| G05F 1/56 | (2006.01) |
|---|---|
| G05F 1/575 | (2006.01) |
| G05F 1/563 | (2006.01) |
| G05F 1/59 | (2006.01) |
| H02M 1/00 | (2006.01) |

(52) U.S. Cl.
CPC .............. *G05F 1/575* (2013.01); *G05F 1/563* (2013.01); *G05F 1/59* (2013.01); *H02M 2001/007* (2013.01)

(58) Field of Classification Search
CPC ............. G05F 3/247; G05F 1/575; G05F 1/59
USPC .............. 323/222, 224, 265, 266, 272, 273, 323/282–285, 289; 330/149, 151
See application file for complete search history.

(56) References Cited

U.S. PATENT DOCUMENTS

| 4,495,471 A * | 1/1985 | Barrett | H03F 3/345 330/149 |
|---|---|---|---|
| 4,739,246 A * | 4/1988 | Thomson | G05F 3/265 323/273 |
| 5,168,209 A * | 12/1992 | Thiel, V | G05F 1/56 323/313 |
| 5,412,309 A * | 5/1995 | Ueunten | G05F 3/267 323/303 |
| 5,889,393 A * | 3/1999 | Wrathall | G05F 1/565 323/280 |

(Continued)

*Primary Examiner* — Rajnikant Patel
(74) *Attorney, Agent, or Firm* — Patent Law Group LLP; Brian D Ogonowsky

(57) ABSTRACT

A driver circuit for a PNP power transistor in an LDO regulator uses a Class AB (push-pull) buffer to supply the necessary base current to an NPN driver transistor, where the NPN driver transistor has its collector connected to the base of the PNP power transistor. A front end circuit of the driver, coupled to drive the Class AB buffer, uses a current diverting transistor, where a first portion of the current is used to control the pull-up transistor in the Class AB buffer, and the remainder of the current is used to control the pull-down transistor in the Class AB buffer, so the driver is very efficient. The portion of the driver circuit between the input of the driver circuit and the base of the NPN driver transistor is an inverting circuit. The driver can properly operate with an input voltage within two diode drops of ground.

9 Claims, 3 Drawing Sheets

(56) References Cited

U.S. PATENT DOCUMENTS 7,342,387 B1\* 3/2008 Li ............................ G05F 1/575
 323/271
2011/0068758 A1\* 3/2011 Chiu ....................... G05F 1/575
 323/280

\* cited by examiner

CLASS AB INVERTING DRIVER FOR PNP BIPOLAR TRANSISTOR LDO REGULATOR

CROSS REFERENCE TO RELATED APPLICATIONS

This application claims priority from U.S. provisional application Ser. No. 62/013,428, by Amitkumar P. Patel et al., filed Jun. 17, 2014, assigned to the present assignee and incorporated by reference.

FIELD OF INVENTION

The present invention relates to low dropout (LDO) regulators, also known as linear regulators, and, in particular, to a technique for driving a PNP bipolar power transistor connected in series between an input voltage and a regulated output voltage.

BACKGROUND

Low dropout PNP bipolar transistor regulators offer a number of benefits which are difficult to replicate with NPN, NMOS, or PMOS transistor based linear regulators, such as reverse input protection, reverse current protection, reverse output protection, low dropout in single supply operation, and low minimum input voltage Vin. Nonetheless, given the high base current requirements of high power PNP based regulators, its driver circuit design is rather involved as it requires tradeoffs in minimum operating voltage, bandwidth, and quiescent current.

While there are many driver circuitries being used in the prior art, they all suffer from significant drawbacks. For instance, FIG. 1 illustrates a commonly used driver circuit 10 which is an NPN bipolar transistor Darlington driver. The driver circuit 10 drives the base of the PNP power transistor 12. An input voltage Vin is applied to the emitter of the PNP power transistor 12, and the collector of the PNP power transistor 12 provides the output voltage Vout to a load typically connected to ground. A feedback control signal is applied to the input of the driver circuit 10, where the control signal is based on the Vout level. The feedback loop (not shown) adjusts the control signal so Vout, or a divided Vout, matches a fixed set voltage. If Vout is above the target voltage, the feedback loop causes the control signal to go down to reduce the conductivity of the PNP power transistor 12 (and to reduce the current through the load) to cause Vout to be at the target voltage.

The various voltage drops of the transistors in FIG. 1 require the minimum Vin to be greater than 2 volts for proper operation, which is too high for some common applications.

FIG. 2 shows another type of driver circuit 16, which provides current gain by utilizing multiple current mirrors. But this approach degrades loop bandwidth (due to additional nodes in the signal path) as well as the regulator's line regulation.

FIG. 3 illustrates a driver 20 where the base of the NPN driver transistor 22 is coupled to a constant current source 24 that can supply sufficient current to pull the base of the PNP power transistor 12 low (for maximum conductivity) over all process and temperature fluctuations. Such a potentially large current source can dramatically increase the quiescent current of the regulator.

FIG. 4 illustrates an NPN driver transistor 26 that is driven by tapping off a small portion of the PNP power transistor 12 base current. However, this can be dangerous as there will be large thermal gradients across the PNP power transistor 12 that will affect the amount of the PNP power transistor base current that is diverted into the NPN driver transistor 26. Moreover, because the driver uses a positive feedback loop, operation of the regulator can lead to loop instabilities especially for a high bandwidth regulator.

Therefore, what is needed is a driver for a PNP power transistor in an LDO regulator that does not suffer from the above-described drawbacks. The LDO regulator should operate with a low input voltage Vin, have high speed, draw low quiescent currents, and a have good high frequency power supply rejection ratio (PSRR).

SUMMARY

A driver circuit for a PNP power transistor in an LDO regulator uses a Class AB (push-pull) buffer to supply the necessary base current to an NPN driver transistor, where the NPN driver transistor has its collector connected to the base of the PNP power transistor and its emitter connected to ground. This allows the minimum Vin for proper operation to be very low. In the preferred embodiment, the driver circuit may be operated with an input voltage of less than two diode drops above ground. The use of the Class AB buffer enables very low quiescent current operation. The LDO regulator bandwidth is very high.

A front end circuit of the driver, coupled to drive the Class AB buffer, uses a single current diverting transistor that controllably diverts current from a current source. A first portion of the current from the current source is used to control the pull-up transistor in the Class AB buffer, and the remainder of the current from the current source is used to control the pull-down transistor in the Class AB buffer, so the driver is very efficient.

The portion of the driver circuit between the input of the driver circuit and the base of the NPN driver transistor is an inverting circuit. The bandwidth of the LDO regulator can be easily increased by adding a capacitor between the input and output of the inverting circuit.

Other embodiments are described.

BRIEF DESCRIPTION OF THE DRAWINGS

Elements in the various figures that are the same or equivalent are labeled with the same numeral.

DETAILED DESCRIPTION

Figure 1:
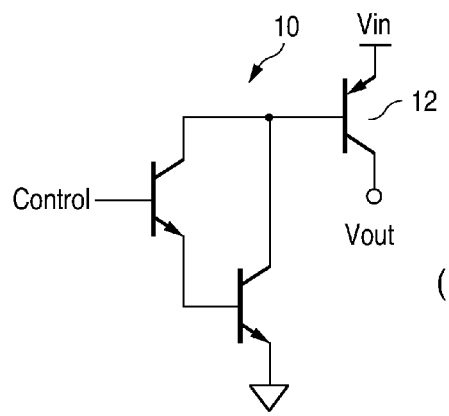
FIG. 1 illustrates a first prior art driver for a PNP power transistor in an LDO regulator.
Figure 2:
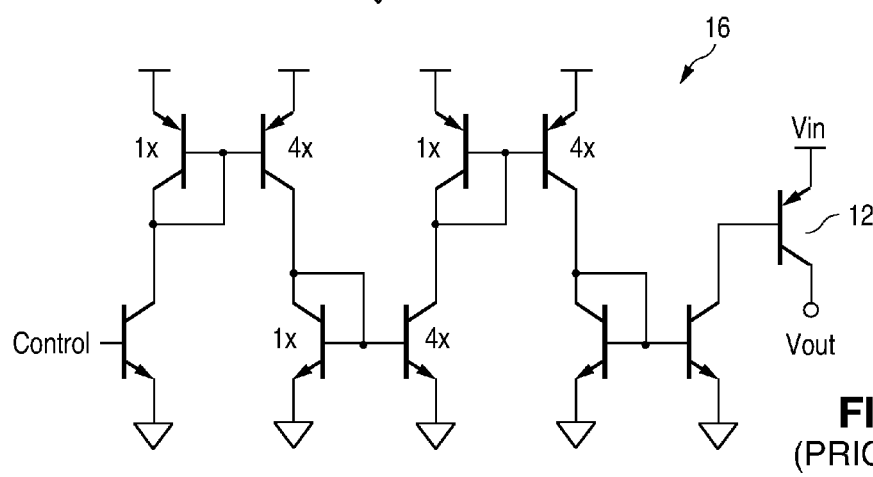
FIG. 2 illustrates a second prior art driver for a PNP power transistor in an LDO regulator.
Figure 3:
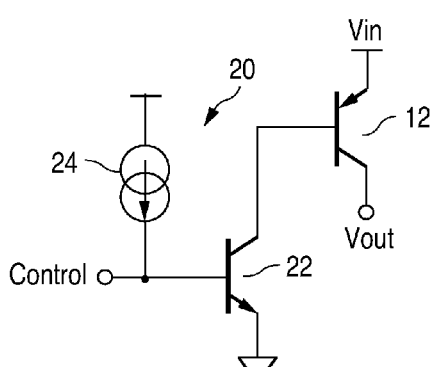
FIG. 3 illustrates a third prior art driver for a PNP power transistor in an LDO regulator.
Figure 4:
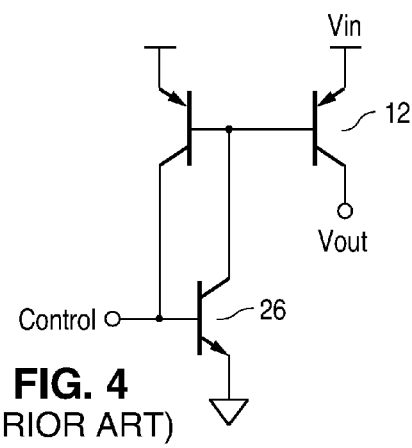
FIG. 4 illustrates a fourth prior art driver for a PNP power transistor in an LDO regulator.
Figure 5:
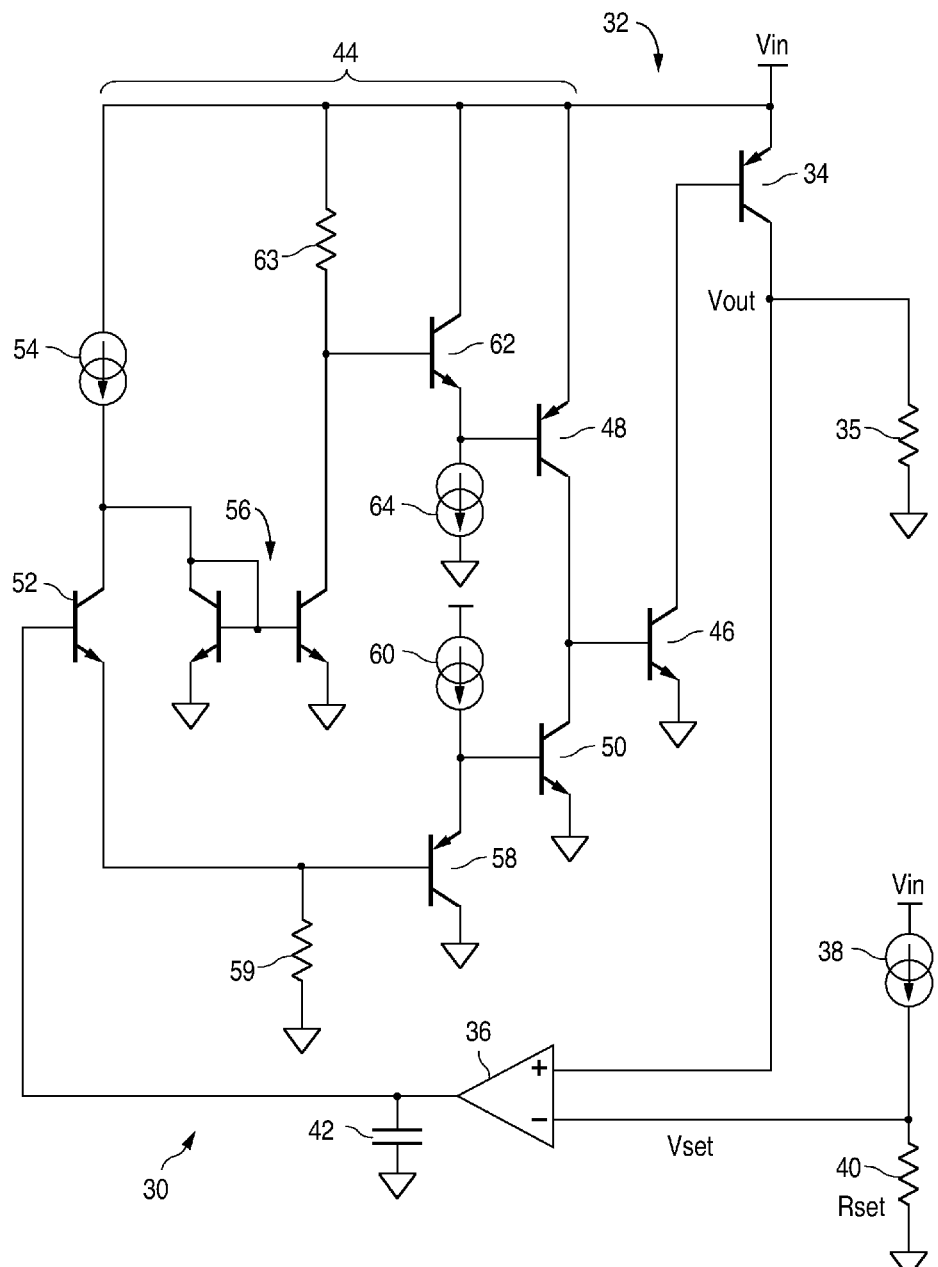
FIG. 5 illustrates an LDO regulator in accordance with a first embodiment of the invention.

FIG. 5 illustrates a feedback circuit 30 and driver circuit 32 for a PNP power transistor 34 in an LDO regulator. The input voltage Vin to be regulated is applied to the emitter of the PNP power transistor 34, and its collector provides the regulated output voltage Vout to a load 35.

The PNP power transistor 34 may supply a high current, such as greater than 5 A, and may require a large base current to enable saturation of the PNP power transistor 34.

The output voltage Vout, or a divided Vout, is applied to the non-inverting input of an error amplifier 36 (a transconductance amplifier), and a set voltage Vset is applied to the inverting input. Vset sets the target Vout. Vset is generated by a current source 38 conducting a known fixed current through a set resistor Rset 40. The voltage drop across Rset 40 is the set voltage. The user typically selects Rset 40 to achieve a target output voltage.

Alternatively, Vset can be a reference voltage, and a resistor divider is coupled to the Vout terminal so that the divided voltage equals the reference voltage when Vout is at the target voltage.

The output of the error amplifier 36 is coupled to a compensation capacitor 42 to improve stability, and the voltage at the capacitor 42 is applied to the input of the inverting class AB buffer (portion 44). The output of the buffer (portion 44) is applied to the base of an NPN transistor 46 acting as a driving transistor for the PNP power transistor 34. The feedback loop 30 controls the conductivity of the PNP power transistor 34 to approximately match Vout to Vset.

If Vout is too low, the output of the error amplifier 36 will be lowered. This signal is inverted by the inverting portion 44 to increase the base voltage of the NPN transistor 46, which pulls down the base of the PNP power transistor 34 to increase its conductivity to raise Vout to match Vset. The opposite occurs if Vout is too high. Since the PNP power transistor 34 may need to operate in saturation to achieve the target Vout, the NPN transistor 46 may be required to conduct a relatively high base current.

The output stage of the inverting portion 44 comprises a PNP transistor 48 and an NPN transistor 50 connected in a push-pull configuration (resulting in a Class AB buffer) so there is low quiescent current. The transistors 48 and 50 are driven by low current circuitry.

The error amplifier 36 controls an NPN transistor 52, at the input of the inverting portion 44, to conduct more or less current from a current source 54. The NPN transistor 52 controllably diverts the current away from a current mirror 56. The diverted current is used to control the NPN transistor 50 in the Class AB buffer, and the remaining current from the current source 54 is used to control the PNP transistor 48 in the Class AB buffer, so there is little wasted current.

Assuming the output of the error amplifier 36 increases (i.e., Vout is too high), the NPN transistor 52 draws an increased current from the current source 54, which raises the voltage applied to the base of the PNP transistor 58 to reduce the conductivity of the PNP transistor 58. A pull-down resistor 59 is coupled to the base of the PNP transistor 58. Reducing the conductivity of the PNP transistor 58 increases the amount of current from the current source 60 into the base of the NPN transistor 50, which increases the conductivity of the NPN transistor 50 to pull down the base of the driver NPN transistor 46.

At the same time, the current drawn by the current mirror 56 is reduced to raise the base voltage of the NPN transistor 62, via the pull-up resistor 63, to further turn it on to supply more of the current sunk by the current source 64. This raises the base voltage of the PNP transistor 48 to lower the current though the PNP transistor 48.

As a result of the operation of the Class AB buffer, the current through the driver NPN transistor 46 is reduced to reduce the conductivity of the PNP power transistor 34, which lowers Vout to achieve the target Vout at the load.

The currents generated by the current sources 54, 60, and 64 are very low so there is little wasted current.

The minimum input voltage Vin needed to properly power the driver circuit 32 can be less than two diode drops.

Another advantage of the proposed buffer is its relatively high speed. In particular, the NPN signal path (which is in parallel with the PNP signal path) from the buffer input to its output only travels through two nodes and both of which are low impedance nodes, thereby allowing this buffer to be used in high speed designs.

In addition to being an effective driver, the proposed solution can also be readily configured to increase the regulator's feedback loop bandwidth by adding a high frequency zero. Although achieving high bandwidth (in the MHz) while driving the large parasitic capacitance at the PNP power transistor's base is typically rather challenging, a high frequency zero (using a capacitor) to combat the pole occurring at the PNP power transistor's base can be easily added to the proposed driver. This is particularly useful for achieving good high frequency PSRR, as it requires higher regulator loop bandwidth.

Figure 6:
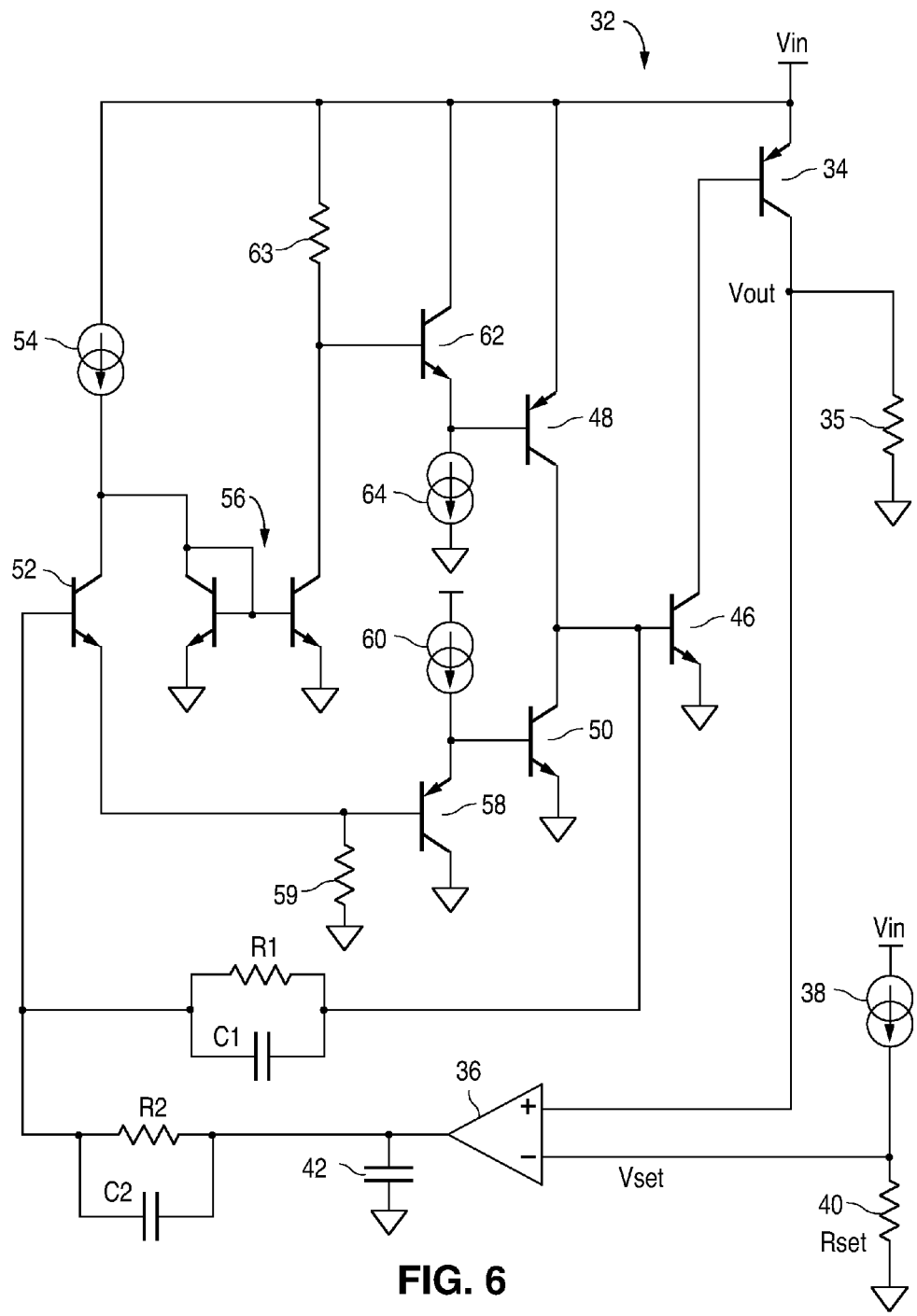
FIG. 6 illustrates an LDO regulator in accordance with a second embodiment of the invention, where an RC circuit is added to improve bandwidth and stability at high frequencies.

The bandwidth can be increased, as shown in FIG. 6, by adding a resistor-capacitor circuit (R1 in parallel with C1) between the base of the driver NPN transistor 46 and the base of the NPN transistor 56. A similar resistor-capacitor circuit (R2 in parallel with C2) can be added to the output of the error amplifier 36. This increases the LDO bandwidth by compensating for the pole at the base of the PNP power transistor 34, thereby also improving high frequency PSRR performance.

The entire LDO regulator may be formed on a single IC, or only the PNP power transistor 34 and Rset 40 may be provided external to the IC.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A low dropout (LDO) regulator comprising:
a first PNP transistor connected in series between an input voltage Vin terminal and an output voltage Vout terminal for coupling to a load;
an NPN driver transistor having a collector coupled to a base of the first PNP transistor, for controlling a conductivity of the PNP transistor, and having an emitter coupled to ground;
an error amplifier receiving a voltage corresponding to the output voltage and receiving a set voltage, the error amplifier being connected in a feedback loop for matching the voltage corresponding to the output voltage to the set voltage; and
an inverting circuit comprising:
a push-pull circuit connected to a base of the NPN driver transistor, the push-pull circuit comprising a second PNP transistor, acting as a pull-up transistor, and a first NPN transistor, acting as a pull-down transistor;
a first control circuit connected to a base of the second PNP transistor;
a second control circuit connected to a base of the first NPN transistor; and
a current diverting transistor, coupled to a first current source, controlling an amount of current to the first control circuit and to the second control circuit, wherein a base of the current diverting transistor is coupled to an output of the error amplifier, wherein the inverting circuit is connected between the input voltage and ground, and wherein the inverting circuit has a minimum voltage drop between the input voltage and ground less than two diode drops to allow the inverting circuit to operate with an input voltage within two diode drops above ground.

2. The regulator of claim 1 wherein the current diverting transistor comprises a second NPN transistor having a collector coupled to the first current source, wherein the first control circuit is coupled to the collector of the second NPN transistor, and wherein the second control circuit is coupled to an emitter of the second NPN transistor.

3. The regulator of claim 2 wherein the first control circuit comprises a current mirror having an input coupled to the collector of the second NPN transistor, wherein an output of the current mirror is coupled to a base of a third NPN transistor acting as a pull-up transistor for the second PNP transistor.

4. The regulator of claim 3 wherein the second control circuit comprises a third PNP transistor having a base coupled to the emitter of the second NPN transistor, wherein the third PNP transistor acts as a pull-down transistor for the first NPN transistor.

5. The regulator of claim 1 further comprising a first capacitor and first resistor coupled between the error amplifier and the base of the current diverting transistor to increase the LDO regulator bandwidth by compensating for the pole at the base of the first PNP transistor, thereby also improving high frequency PSRR performance.

6. The regulator of claim 5 further comprising a second capacitor and second resistor coupled between the base of the current diverting transistor and the base of the NPN driver transistor.

7. The regulator of claim 1 further comprising a capacitor and resistor coupled between the base of the current diverting transistor and the base of the NPN driver transistor.

8. The regulator of claim 1 wherein the set voltage equals a target Vout level.

9. The regulator of claim 1 wherein the set voltage equals a divided Vout when Vout is at a target voltage.

\* \* \* \* \*